United States Patent
Resch et al.

(10) Patent No.: US 10,705,923 B2
(45) Date of Patent: *Jul. 7, 2020

(54) DISPERSED STORAGE NETWORK WITH CUSTOMIZED SECURITY AND METHODS FOR USE THEREWITH

(71) Applicant: International Business Machines Corporation, Armonk, NY (US)

(72) Inventors: Jason K. Resch, Chicago, IL (US); Wesley Leggette, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 16/185,573

(22) Filed: Nov. 9, 2018

(65) Prior Publication Data
US 2019/0095290 A1    Mar. 28, 2019

Related U.S. Application Data

(63) Continuation of application No. 14/315,775, filed on Jun. 26, 2014, now Pat. No. 10,180,884, which is a
(Continued)

(51) Int. Cl.
*H04L 29/06* (2006.01)
*G06F 11/14* (2006.01)
(Continued)

(52) U.S. Cl.
CPC .......... *G06F 11/1464* (2013.01); *G06F 3/065* (2013.01); *G06F 3/067* (2013.01);
(Continued)

(58) Field of Classification Search
CPC combination set(s) only.
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Chung; An Automatic Data Segmentation Method for 3D Measured Data Points; National Taiwan University; pp. 1-8; 1998.
(Continued)

*Primary Examiner* — Brandon S Hoffman
*Assistant Examiner* — William A Corum, Jr.
(74) *Attorney, Agent, or Firm* — Garlick & Markison; Timothy W. Markison; Bruce E. Stuckman

(57) ABSTRACT

A method begins with a processing module selecting one of a plurality of dispersed storage (DS) processing modules for facilitating access to a dispersed storage network (DSN) memory. The method continues with the processing module sending a DSN memory access request to the one of the plurality of DS processing modules. The method continues with the processing module selecting another one of the plurality of DS processing modules when no response is received within a given time frame or when the response to the access request does not include an access indication. The method continues with the processing module sending the DSN memory access request to the another one of the plurality of DS processing modules.

20 Claims, 11 Drawing Sheets

Related U.S. Application Data continuation of application No. 12/886,389, filed on Sep. 20, 2010, now Pat. No. 9,027,080, which is a continuation-in-part of application No. 12/080,042, filed on Mar. 31, 2008, now Pat. No. 8,880,799, which is a continuation-in-part of application No. 11/973,542, filed on Oct. 9, 2007, now Pat. No. 9,996,413, and a continuation-in-part of application No. 11/403,391, filed on Apr. 13, 2006, now Pat. No. 7,546,427, which is a continuation-in-part of application No. 11/241,555, filed on Sep. 30, 2005, now Pat. No. 7,953,937.

(60) Provisional application No. 61/264,297, filed on Nov. 25, 2009.

(51) Int. Cl.
| | |
|---|---|
| *G06F 16/9535* | (2019.01) |
| *G06F 3/06* | (2006.01) |
| *H04L 29/08* | (2006.01) |
| *G06F 16/172* | (2019.01) |
| G06F 11/07 | (2006.01) |
| G06F 11/20 | (2006.01) |
| G06F 11/10 | (2006.01) |

(52) U.S. Cl.
CPC .......... *G06F 3/0617* (2013.01); *G06F 3/0619* (2013.01); *G06F 3/0635* (2013.01); *G06F 16/172* (2019.01); *G06F 16/9535* (2019.01); *H04L 63/10* (2013.01); *H04L 67/1097* (2013.01); *G06F 11/0709* (2013.01); *G06F 11/0751* (2013.01); *G06F 11/1076* (2013.01); *G06F 11/2038* (2013.01); *G06F 11/2048* (2013.01); *G06F 11/2094* (2013.01); *G06F 2201/80* (2013.01); *G06F 2211/1028* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,117,155 | B2 | 2/2012 | Chen et al. |
| 8,396,895 | B2 | 3/2013 | Miloushev et al. |
| 8,418,233 | B1 | 4/2013 | Hughes |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2005/0283645 | A1 | 12/2005 | Turner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0150965 | A1 | 6/2007 | Redlich et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0264905 | A1 | 10/2011 | Ovsiannikov |
| 2012/0042162 | A1 | 2/2012 | Anglin et al. |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

(56) References Cited

OTHER PUBLICATIONS

Shamir; How to Share a Secret; Communications of the ACM; vol. 22, No. 11; Nov. 1979; pp. 612-613.
Smith; Lightweight Directory Access Protocol (LDAP): String Representation of Search Filters; IETF Network Working Group; RFC 4515; Jun. 2006; pp. 1-12.
Smith; Lightweight Directory Access Protocol (LDAP): Uniform Resource Locator; IETF Network Working Group; RFC 4516; Jun. 2006; pp. 1-15.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

computing system 10

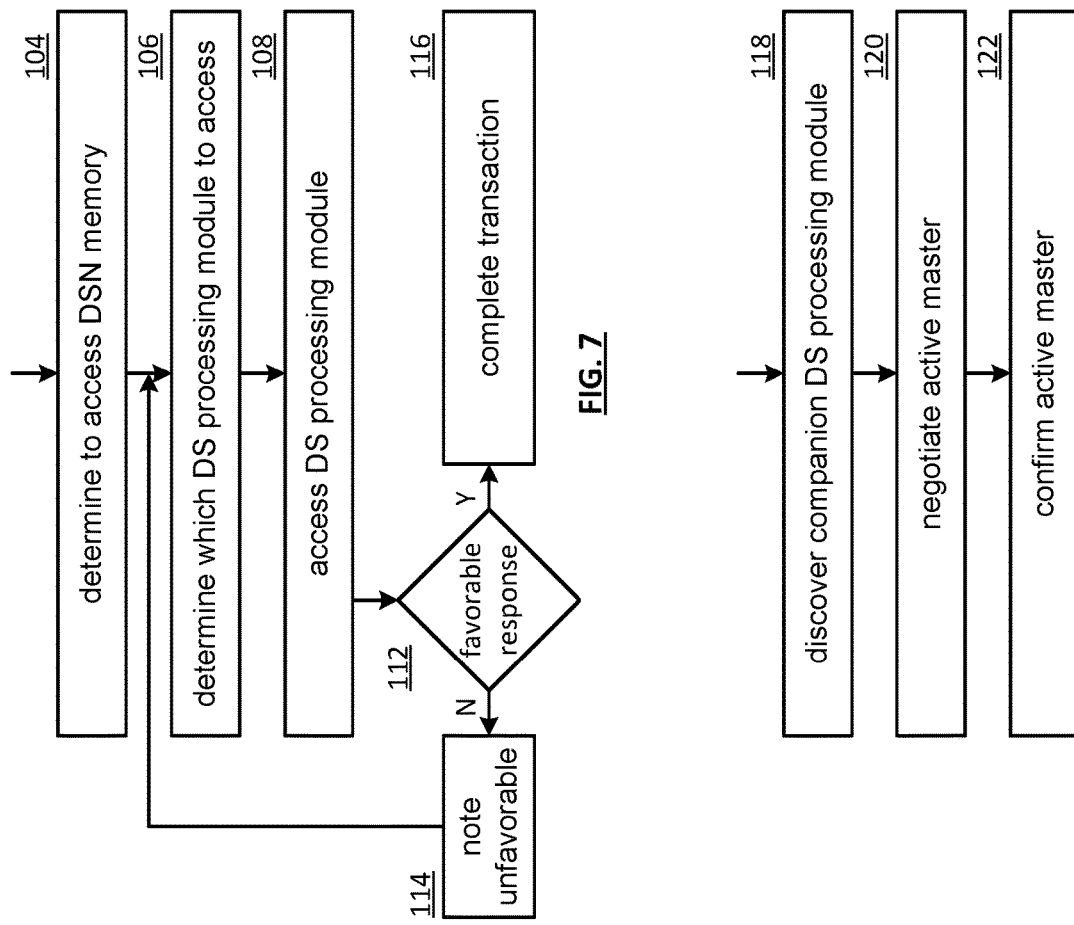
FIG. 7
FIG. 8
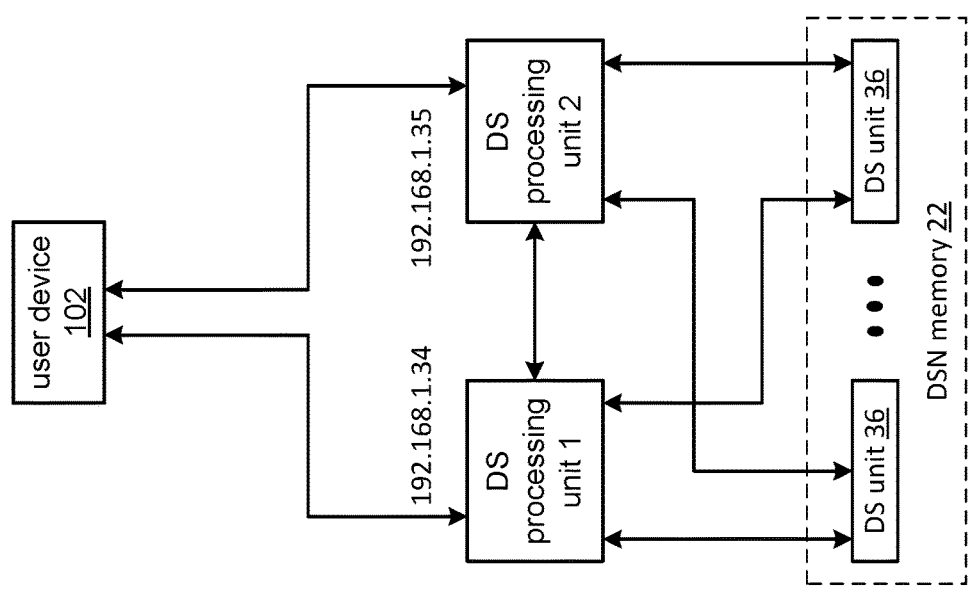
FIG. 6

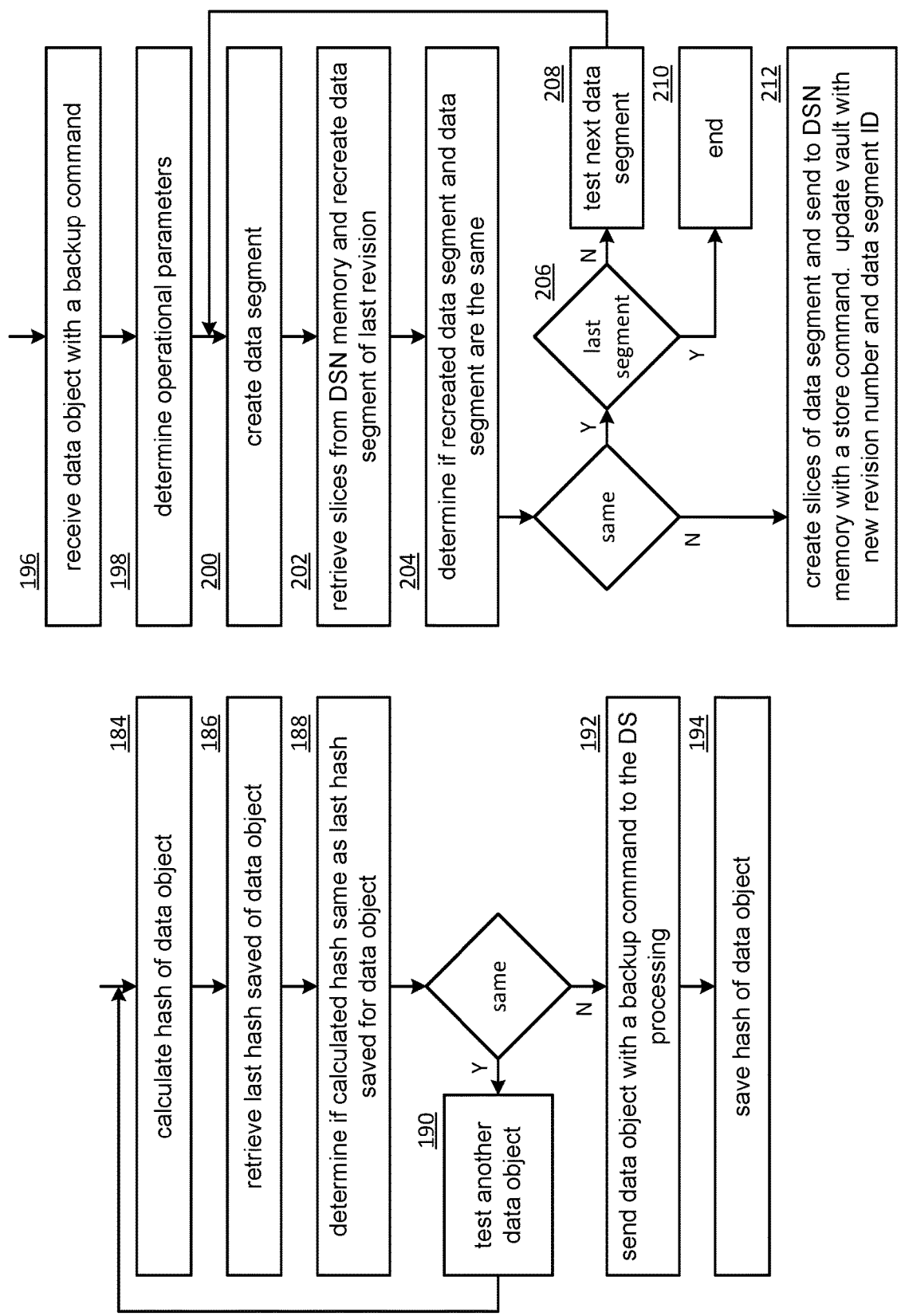

DISPERSED STORAGE NETWORK WITH CUSTOMIZED SECURITY AND METHODS FOR USE THEREWITH

CROSS REFERENCE TO RELATED PATENTS

The present U.S. Utility Patent Application claims priority pursuant to 35 U.S.C. § 120 as a continuation of U.S. Utility application Ser. No. 14/315,775, entitled "DISPERSED STORAGE NETWORK WITH CUSTOMIZED SECURITY AND METHODS FOR USE THEREWITH", filed Jun. 26, 2014, which is a continuation of U.S. Utility application Ser. No. 12/886,389, entitled "PROXY ACCESS TO A DISPERSED STORAGE NETWORK", filed Sep. 20, 2010, issued as U.S. Pat. No. 9,027,080 on May 5, 2015, which claims priority pursuant to 35 U.S.C. § 119(e) to U.S. Provisional Application No. 61/264,297, entitled "PROXY ACCESS TO A DISPERSED STORAGE NETWORK", filed Nov. 25, 2009, all of which are hereby incorporated herein by reference in their entirety and made part of the present U.S. Utility Patent Application for all purposes.

U.S. Utility application Ser. No. 12/886,389 claims priority pursuant to 35 U.S.C. § 120 as a continuation-in-part of U.S. Utility application Ser. No. 12/080,042, entitled "REBUILDING DATA ON A DISPERSED STORAGE NETWORK, filed Mar. 31, 2008, issued as U.S. Pat. No. 8,880,799 on Nov. 4, 2014, which is a continuation-in-part of U.S. Utility application Ser. No. 11/403,391, entitled "SYSTEM FOR REBUILDING DISPERSED DATA", filed Apr. 13, 2006, issued as U.S. Pat. No. 7,546,427 on Jun. 9, 2009, which is a continuation-in-part of U.S. Utility application Ser. No. 11/241,555, entitled "SYSTEMS, METHODS AND APPARATUS FOR SUBDIVIDING DATA FOR STORAGE IN A DISPERSED DATA STORAGE GRID", filed Sep. 30, 2005, issued as U.S. Pat. No. 7,953,937 on May 31, 2011, all of which are hereby incorporated herein by reference in their entirety and made part of the present U.S. Utility Patent Application for all purposes.

U.S. Utility application Ser. No. 12/080,042 also claims priority pursuant to 35 U.S.C. § 120 as a continuation-in-part of U.S. Utility application Ser. No. 11/973,542, entitled "ENSURING DATA INTEGRITY ON A DISPERSED STORAGE GRID", filed Oct. 9, 2007, issued as U.S. Pat. No. 9,996,413 on Jun. 12, 2018, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 6 is a schematic block diagram of another embodiment of a computing system in accordance with the invention;

FIG. 7 is a flowchart illustrating an example of accessing a dispersed storage network (DSN) memory in accordance with the invention;

FIG. 8 is a flowchart illustrating an example of determining an active master dispersed storage (DS) processing unit in accordance with the invention;

FIG. 12 is a flowchart illustrating an example of detecting a file change in accordance with the invention;

FIG. 13 is a flowchart illustrating an example of backing up a data object in accordance with the invention;

DETAILED DESCRIPTION OF THE INVENTION

Figure 1:
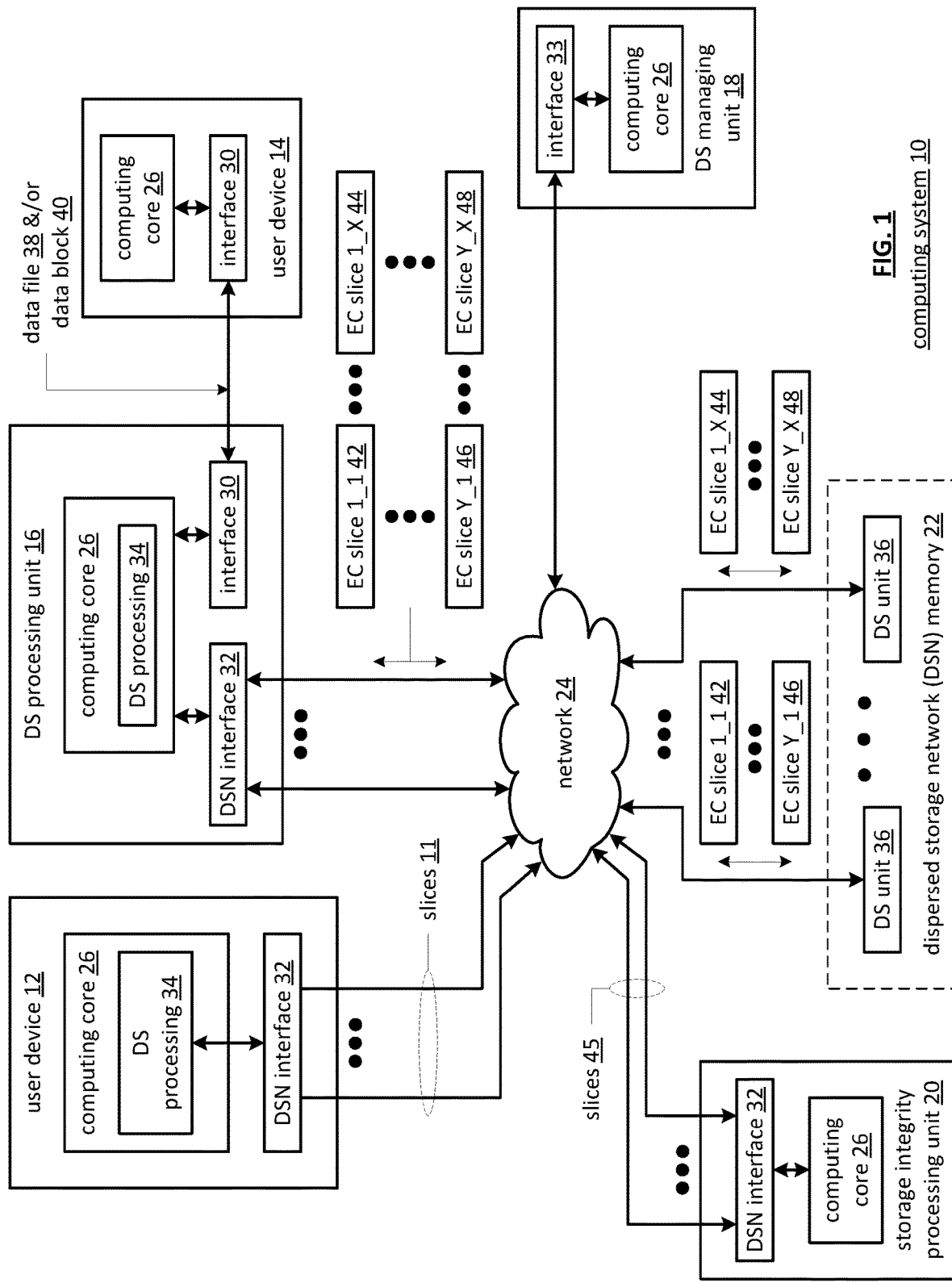
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public interne systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-15.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the computing system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the computing system 10 for potential failures, determines the devices and/or units' activation status, determines the devices' and/or units' loading, and any other system level operation that affects the performance level of the computing system 10. For example, the DS managing unit 18 receives and aggregates network management alarms, alerts, errors, status information, performance information, and messages from the devices 12-14 and/or the units/memory 16, 20, 22. For example, the DS managing unit 18 receives a simple network management protocol (SNMP) message regarding the status of the DS processing unit 16.

The DS managing unit 18 performs the network maintenance by identifying equipment within the computing system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) processing 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-15.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the user device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
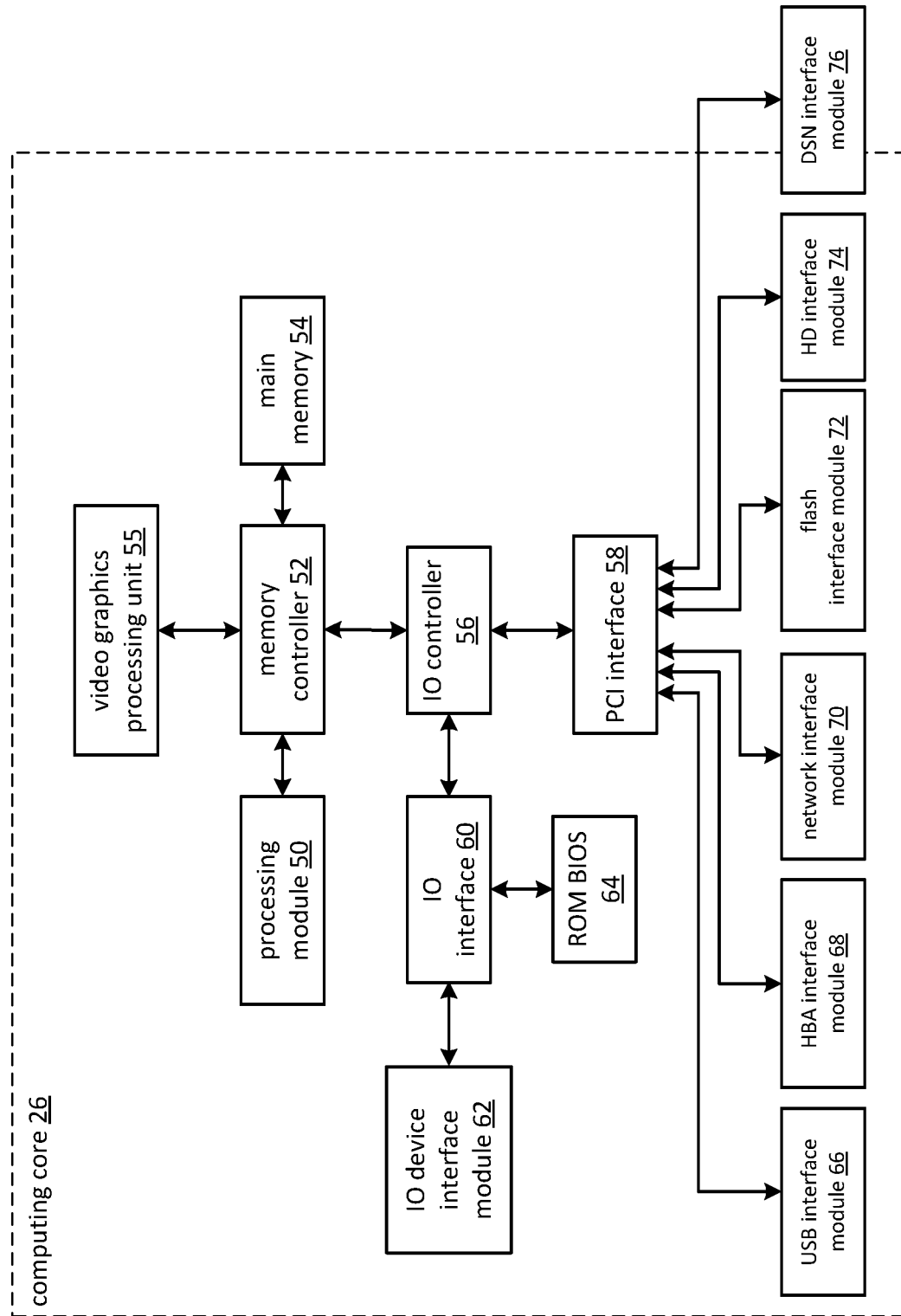
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-15.

Figure 3:
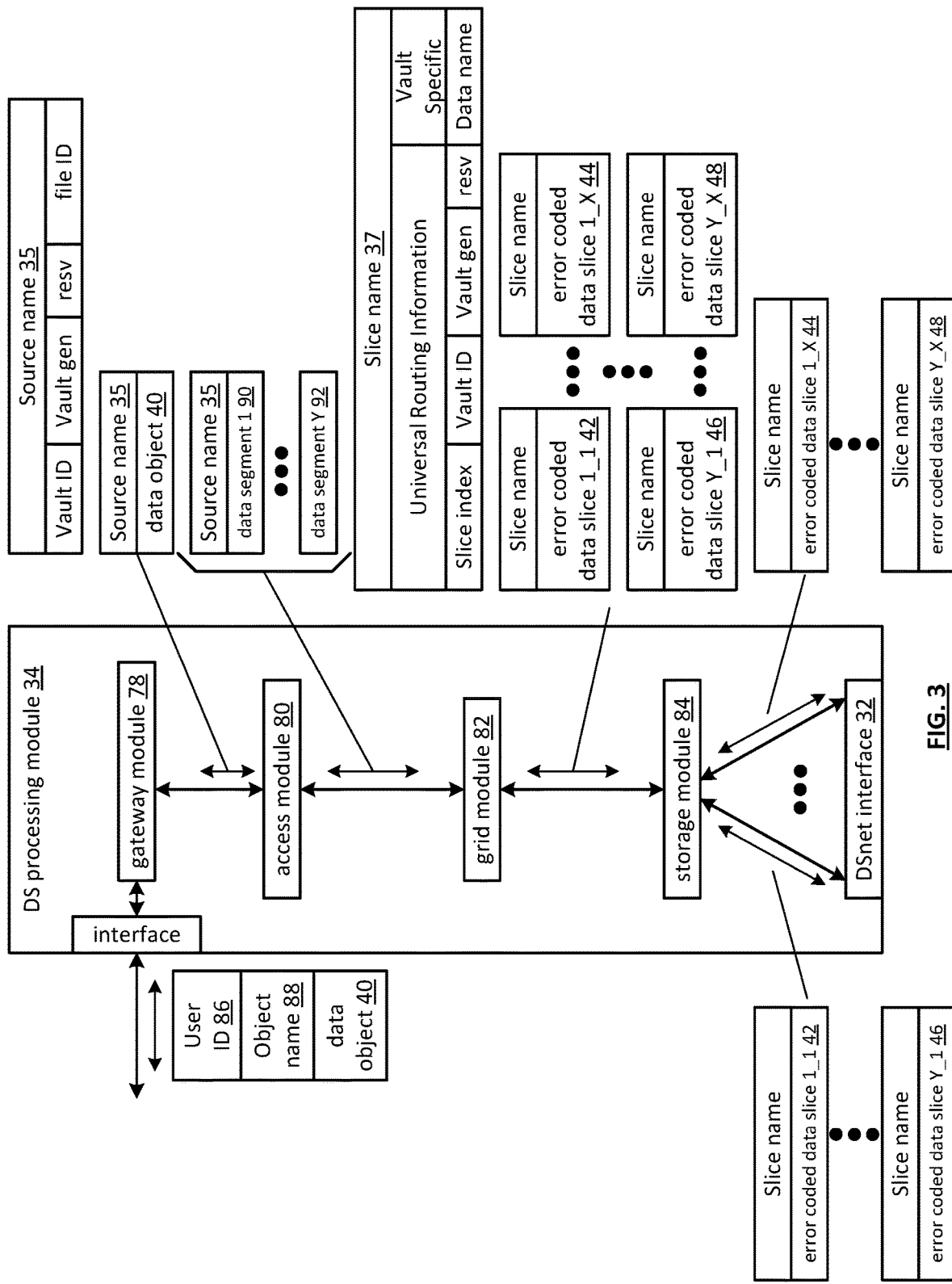
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the DS management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-48.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
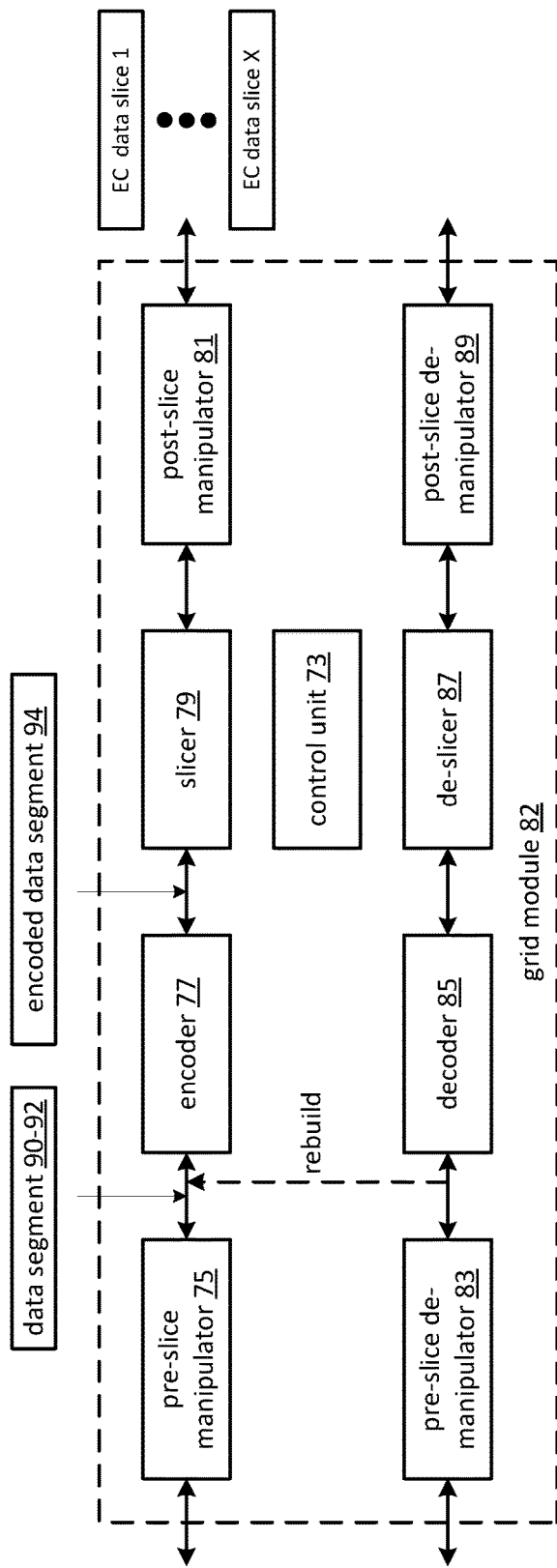
FIG. 4 is a schematic block diagram of an embodiment of a grid module in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of a write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 90-92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 90-92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 90-92, the same encoding algorithm for the data segments 90-92 of a data object, or a combination thereof.

The encoded data segment 94 is of greater size than the data segment 90-92 by the overhead rate of the encoding algorithm by a factor of X/T, where X is the width or number of slices, and T is the read threshold. In this regard, the corresponding decoding process can accommodate at most X-T missing EC data slices and still recreate the data segment 90-92. For example, if X=16 and T=10, then the data segment 90-92 will be recoverable as long as 10 or more EC data slices per segment are not corrupted.

The slicer 79 transforms the encoded data segment 94 into EC data slices in accordance with the slicing parameter from the vault for this user and/or data segment 90-92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

Figure 5:
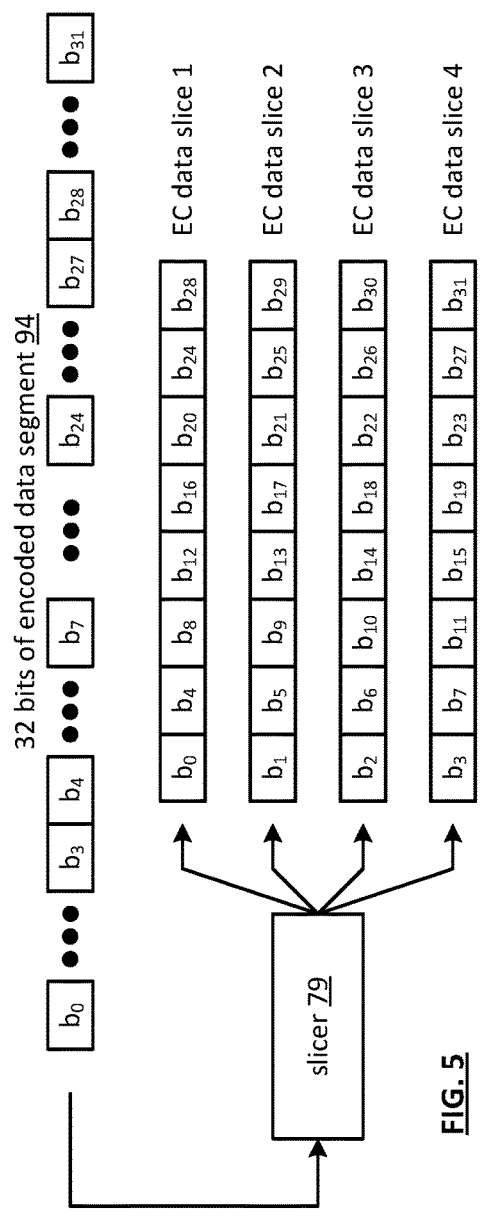
FIG. 5 is a diagram of an example embodiment of error coded data slice creation in accordance with the invention.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

FIG. 6 is a schematic block diagram of another embodiment of a computing system that includes at least one user device 102, a plurality (two or more) of dispersed storage (DS) processing units 1-2, and a dispersed storage network (DSN) memory 22. The DSN memory 22 includes a plurality of dispersed storage (DS) units 36. Each of the DS processing units includes one or more processing modules, may be a separate device, may be contained in one or more common devices, and/or may be contained within a user device. Note that the system may further include a plurality of user devices 102 and/or a plurality of DSN memories 22.

Each DS processing unit 1-2 has a unique Internet protocol (IP) address to facilitate individual addressing by the user device(s), the DS units 36, and/or other system elements (not shown). For example, DS processing unit 1 has IP address 192.168.1.34 and DS processing unit 2 has IP address 192.168.1.35. In addition, the DS processing units 1-2 maintain a responsibility indicator with respect to responding to DSN memory access requests from the user device 102. The responsibility indicator may indicate various responsibility levels including no responsibility, a proxy DS processing module, and/or a master DS processing module. For example, DS processing unit 1 has the responsibility of the master DS processing module and DS processing unit 2 has the responsibility of the proxy DS processing module during a first time period. In this example, DS processing unit 1 directly processes DSN memory 22 access requests from the user device 102 during the first time period and DS processing unit 2 indirectly processes DSN memory 22 access requests from the user device 102 during the first time period by forwarding them to DS processing unit 1.

The master DS processing module responsibility includes at least four activities. The first includes a determination of the master DS processing unit. The second includes establishing a connection between the DSN memory 22 and the master DS processing unit. The third includes establishing a connection between the user device 102 and the master DS processing unit. The fourth includes facilitating the utilization of the DSN memory 22 by the user device 102.

In the first activity, the DS processing units 1-2 negotiate to determine which one of them will serve as the active master for the user device 102. The determination may be based on one or more of a random decision, a schedule, a predetermination, a command, a time duration since the last determination, DS processing unit performance, DS processing unit errors, DS processing unit capabilities, and a computing system loading level indicator. In an example, the DS processing unit 1 with the master DS processing unit responsibility processes all of the DSN memory 22 access requests from the user device 102. In an example, DS processing unit 2 with the proxy responsibility assists the master DS processing unit 1 by transferring messages between the master DS processing unit 1 and the user device 102. An embodiment of method for determining the master DS processing unit will be discussed in greater detail with reference to FIG. 8.

In the second activity, the master DS processing unit 1-2 establishes a connection with the DS units 36 of the DSN memory 22. In an example, the DS unit 36 queries one or more of the DS processing units 1-2 to determine which one is the active master. Once the master is identified, the DS units 36 establish an authenticated connection with the master DS processing unit by exchanging signed certificates with a public key infrastructure (PKI) scheme.

In the third activity, the master DS processing unit establishes a connection with the user device 102. In an example, the user device 102 queries one or more of the DS processing units to determine its responsibilities. Having identified the master, the user device establishes an authenticated connection with the master DS processing unit 1 by exchanging signed certificates with a public key infrastructure (PKI) scheme. In addition, or in the alternative, the user device 102 establishes an authenticated connection with DS processing unit 2 that is not the master by exchanging signed certificates with a public key infrastructure (PKI) scheme. In this manner, the user device 102 may choose to use the proxy (e.g., non-master) DS processing unit when the master DS processing unit is not readily available (e.g., when the network 24 is down to the master and/or when the master is too busy).

In the fourth activity, the master DS processing unit facilitates the user device 102 accessing the DSN memory 22. For example, the master DS processing unit receives a DSN memory access request (e.g., store, retrieve, delete, list) from the user device over the established connection and processes it accordingly. Alternatively, the proxy DS processing unit receives the DSN memory access request from the user device and forwards the DSN memory access request to the master DS processing unit 1 for processing. In an instance, the user device 102 sends the DSN memory access request to DS processing unit 2 that is not the master. As another alternative, the proxy DS processing unit receives the DSN memory access request from the user device, processes it, and may further inform the master DS processing unit of the DSN memory access request and processing of it.

FIG. 7 is a flowchart illustrating an example of accessing a dispersed storage network (DSN) memory. The method begins at step 104 where a processing module of a user device (or other device of the system) determines to access the DSN memory. Such a determination may be based on a requirement to perform one or more of storing data, retrieving data, deleting data, and listing data. At step 106, the processing module selects one of the dispersed storage (DS) processing modules to be a master for facilitating access to the DSN memory. Such a selection may be based on one or more of a query, a slice name associated with the encoded data slice, a vault identifier, a DSN memory identifier, a list of DS processing module identifiers, a DS processing module assignment list, a DS processing module performance indicator, a DS processing module capability indicator, and a last utilized DS processing module identifier. In an example, the processing module determines a random DS processing module of a plurality of candidate master DS processing modules. In another example, the processing module determines a DS processing module of a plurality of master DS processing units where the DS processing module was not recently utilized (e.g., round robin selection).

The method continues at step 108 where the processing module sends a DSN memory access request to the selected DS processing module (e.g., master or proxy). Note that the access request includes one of more of a request to store an encoded data slice, a request to delete the encoded data slice, a request to list the encoded data slice, and a request to retrieve the encoded data slice. The selected DS processing module determines if it will process the request, creates a request response, and sends the request response to the processing module of the user device. The request response indicates that the selected DS processing module will process the request or not. The method of determination of the response is discussed in greater detail with reference to FIG. 9.

At step 112, the processing module receives the request response from the selected DS processing module and determines if the response is favorable. Note that the response includes one of an active master access indicator, a master DS processing module identifier, a proxy access indicator, and a rejection message. The processing module determines that the response is favorable when the response indicates that the selected DS processing module will process the request (e.g., directly as the master or as a proxy to a master) and determines that the response is not favorable when no response is received within a given time frame or when the response to the access request does not include an access indication.

When the response is not favorable, the method continues at step 114, where the processing module saves a DS processing module identifier of the selected DS processing module with the unfavorable response and the method branches back to step 106 where the processing module selects another DS processing module. Alternatively, or in addition to, the processing module receives the identity of the other DS processing module in the response. When the response is favorable, the method continues at step 116 where the processing module and selected DS processing module complete a transaction of the DSN memory access request (e.g., the processing module sends a data object to the DS processing module for storage in the DSN memory when the access request includes a storage request).

FIG. 8 is a flowchart illustrating an example of determining a master dispersed storage (DS) processing module. The method begins at step 118 where a processing module attempts to discover companion DS processing modules, which may be a group of DS processing modules where at least one DS processing modules is a master DS processing module. For example, one DS processing module is a master at a time and master responsibilities may change from time to time. As another example, two or more DS processing modules are co-masters and their respective master responsibilities may change from time to time.

The discovery of the companion DS processing modules may be based on one or more of a list, a command, a latency ping test, a configuration file, and a query. For example, the processing module discovers a companion DS processing module via a latency ping test (e.g., where the configuration file specifies selection based on low latencies of the same site).

The method continues at step 120 where the processing module negotiates the master responsibility with the other companion DS processing module(s) based on one or more of a random choice, a schedule, a predetermination, a command, a time duration since the last determination, DS processing module performance, DS processing module errors, DS processing module capabilities, and a computing system loading level indicator. For example, one processing module may negotiate that one or more of the master responsibilities to another DS processing module when it has not recently served as the master processing module.

At step 122, the processing module confirms the master DS processing module responsibility with the other companion DS processing module(s) by sending a confirmation message to the other companion DS processing module(s). Each of the DS processing modules then saves their current master responsibilities (if any) and those of the other DS processing modules.

Figure 9:
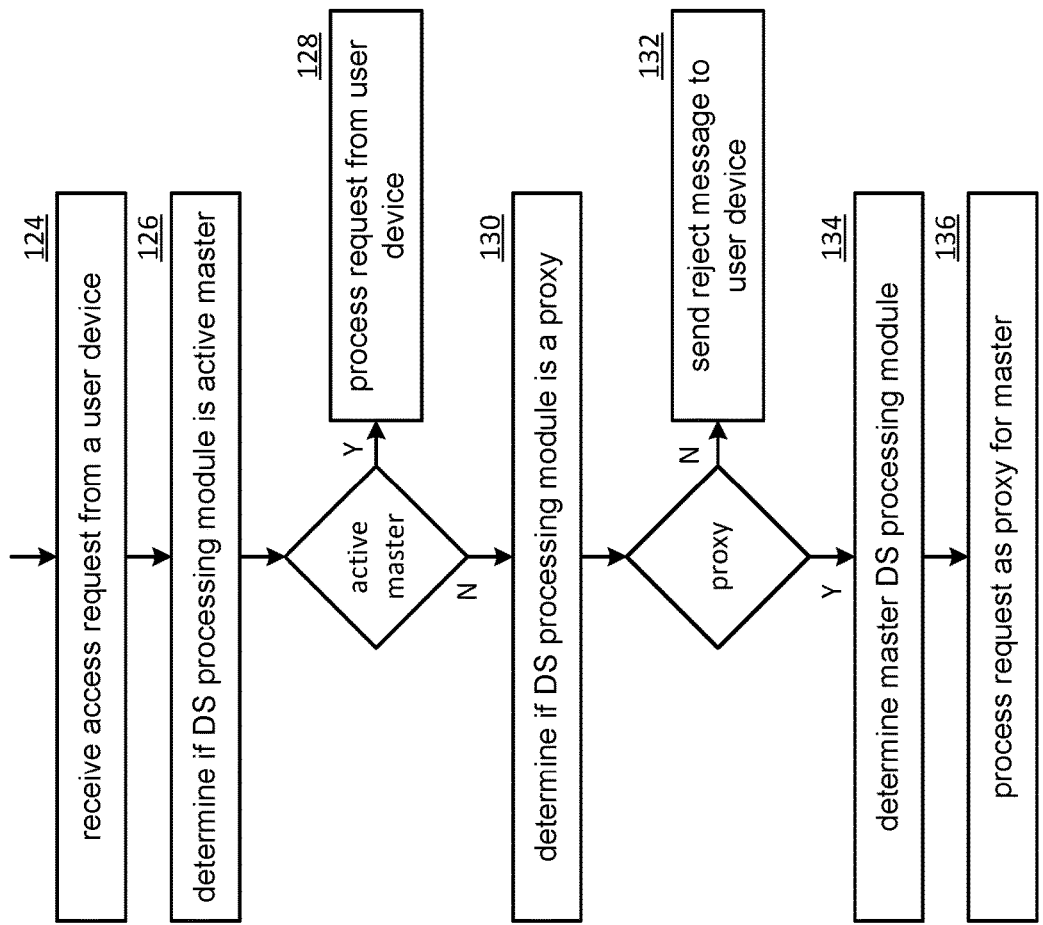
FIG. 9 is a flowchart illustrating an example of processing a dispersed storage network (DSN) memory access request in accordance with the invention.

FIG. 9 is a flowchart illustrating an example of processing a dispersed storage network (DSN) memory access request. The method begins at step 124 where a processing module of a DS processing unit receives, from a user device, an access request (e.g., store, retrieve, delete, list) to a dispersed storage network (DSN) memory. At step 126, the processing module determines responsibility for the access request (e.g., does it have master responsibilities). Such a determination includes at least one of obtaining a master DS processing module indicator, obtaining a proxy access indicator, sending a query message, interpreting a slice name associated with the encoded data slice, interpreting a user device identifier, interpreting a vault identifier, interpreting a DSN memory identifier, interpreting a list of dispersed storage (DS) processing module identifiers, interpreting a DS processing module assignment list, interpreting a DS processing module performance indicator, interpreting a DS processing module capability indicator.

When the processing module is the master DS processing module, the method continues at step 128 where processing module processes the request from the user device. Note that processing the request may include sending an access request response to the user device to confirm processing, accessing the DSN memory over the connections with the DS units to store, retrieve, and/or delete data, and to send and receive data to and from the user device.

When the processing module is not the master DS processing module, the method continues at step 130 where the processing module determines if it has proxy responsibilities. If not, the method continues to step 132 where the processing module ignores the access request or sends a rejection message (e.g., indicating that the processing module is not a master and not a proxy). Alternatively, or in addition to, the processing module may send a message to the user device that identifies the master DS processing module when the responsibility is a redirection function.

When the processing module has proxy responsibilities, the method continues at step 134 where the processing module identifies a master DS processing module. The master DS processing module may be identified by obtaining a master DS processing module indicator, sending a query message, interpreting a slice name associated with the encoded data slice, interpreting a vault identifier, interpreting a DSN memory identifier, interpreting a list of DS processing module identifiers, accessing a DS processing module assignment list, interpreting a DS processing module performance indicator, interpreting a DS processing module capability indicator, and/or interpreting a last utilized DS processing module identifier. For example, the processing module identifies the master DS processing module based on accessing the DS processing module assignment list.

At step 136, the processing module performs a proxy function related to the access request on behalf of the user device with the master DS processing module. The proxy function includes one or more of forwarding the access request to the master DS processing module, receiving a response from the master DS processing module, and forwarding the response to the user device.

Figure 10:
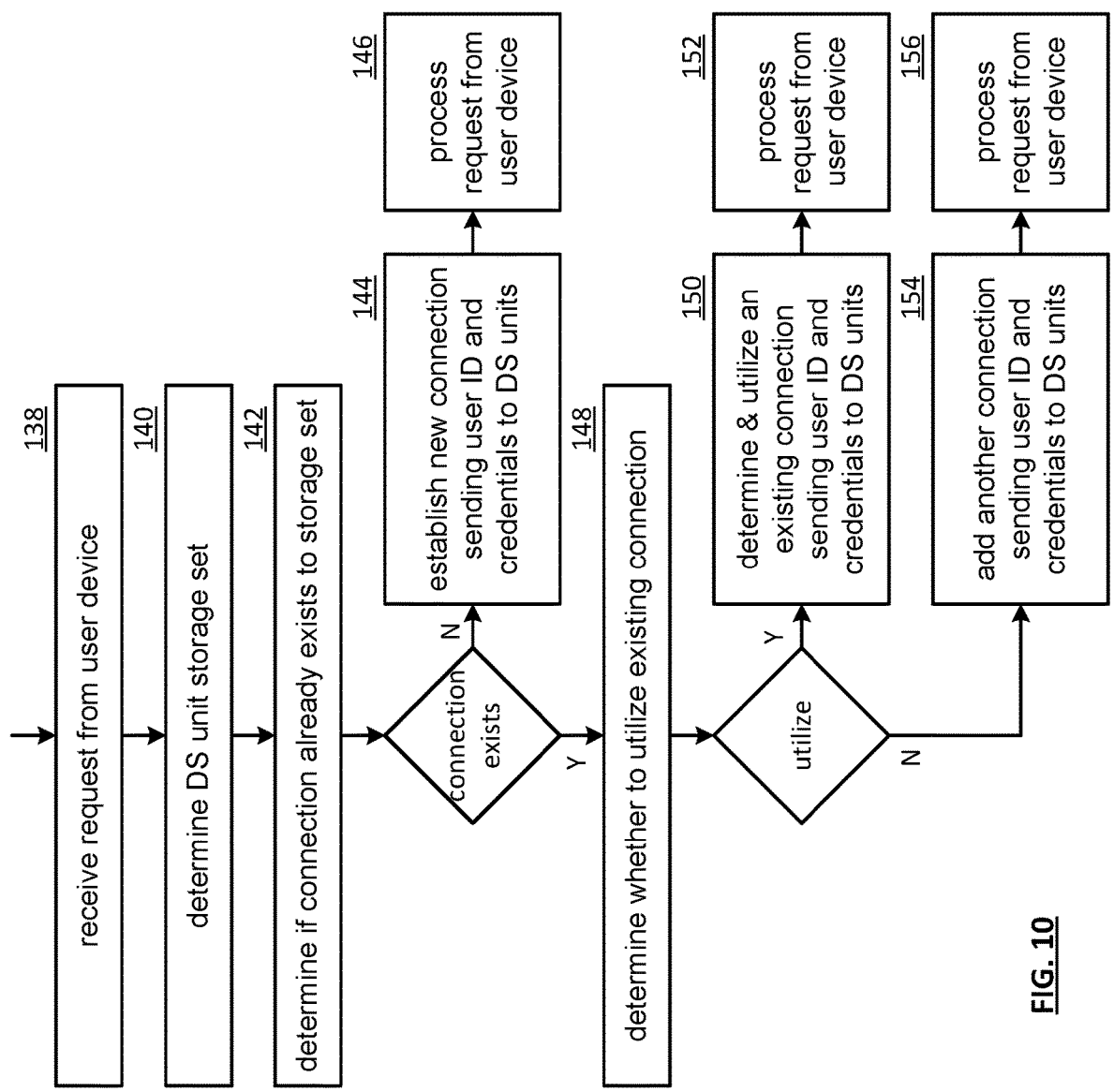
FIG. 10 is a flowchart illustrating an example of establishing a connection with a dispersed storage (DS) unit in accordance with the invention.

FIG. 10 is a flowchart illustrating an example of establishing a connection with a dispersed storage (DS) unit. The method begins at step 138 where a processing module receives a request (e.g., store, retrieve, delete, list) to access a DSN memory from a user device. The request may include one or more of the user ID, a request type, authentication credentials (e.g., a public key interface (PKI) signed certificate), a security indicator, a performance indicator, and a priority indicator.

At step 140, the processing module determines a DS unit storage set that includes the DS units that make up pillars of where slices are stored for the same data segment. Such a determination may be based on one or more of a lookup of the virtual DSN address to physical location table, a predetermination, a command, a list, the user ID, the request type, the authentication credentials (e.g., a PKI signed certificate), the security indicator, the performance indicator, and the priority indicator.

At step 142, the processing module determines whether a connection already exists with each DS unit of the DS unit storage set based on one or more of a lookup of previous connections, a predetermination, a command, a list, the user ID, the request type, and a query. Note that a connection indicates the DS processing unit and the DS unit have previously successfully exchanged authentication credentials. In an example, the exchange may include establishing cipher algorithms and keys.

When the connection does not exist, the method continues at step 144 where the processing module establishes a new connection with each DS unit that does have a connection by sending the user ID and the authentication credentials to the DS unit(s). The processing module adds the connection in a list, which is referenced during subsequent DSN memory access requests. At step 146, the processing module processes the request from the user device. Note that processing the request may include sending an access request response to the user device to confirm processing, accessing the DSN memory over the connections with the DS units to store, retrieve, and/or delete data, and to send and receive data to and from the user device.

When the connection exists, the method continues at step 148 where the processing module determines whether to utilize the existing connection. Such a determination may be based on one or more of a lookup of previous connections, a measured connection utilization indicator, a connection capacity estimate, a connection load estimate for the user device, a predetermination, a command, a list, the user ID, the request type, the security indicator, the performance indicator, the priority indicator, and a query. For example, the DS processing may determine to utilize an existing connection when the difference between the connection capacity estimate and the sum of the connection load estimate for the user device and the measured connection utilization indicator is greater than a threshold. For instance, there is more than a threshold of estimated capacity left over after adding the estimated user device transaction traffic to the existing connection load. Note that there may be more than one connection between the DS processing unit and the DS unit. Further note that each connection may be utilized for one or more user device in user-device-to-DSN-memory access transactions. For example, the processing module may determine to trunk user transactions over a pool of connections.

When an existing connection is going to be used, the method continues at step 150 where the DS processing module determines which existing connection to utilize and utilizes the existing connection by sending the user ID and the authentication credentials to the DS unit(s) to authenticate the user (e.g., but not to establish a new connection). Such a determination may be based on one or more of a lookup of previous connections, a connection capacity estimate, a connection load estimate for the user device, a predetermination, a command, a list, the user ID, the request type, the security indicator, the performance indicator, the priority indicator, and/or a query. In addition, the processing module adds or updates the connection in the connection list. At step 152, the processing module processes the request from the user device, which may include sending an access request response to the user device to confirm processing, accessing the DSN memory over the connections with the DS units to store, retrieve, and/or delete data, and to send and receive data to and from the user device.

When an existing connection is not going to be used, the method continues at step 154 where the processing module adds another connection, notifies the user device, and updates credentials. For example, the processing module determines to add a connection when the difference between the connection capacity estimate and the sum of the connection load estimate for the user device and the measured connection utilization indicator is less than a threshold. For instance, there is less than a threshold (e.g., not enough) of estimated capacity left over after adding the estimated user device transaction traffic to the existing connection load. In another example, the processing module determines to add a connection when a security indicator warrants a new connection (e.g., a higher than average level of security is required). In addition, the processing module adds the connection to the connection list. At step 156, the processing module processes the request from the user device as previously discussed.

Figure 11:
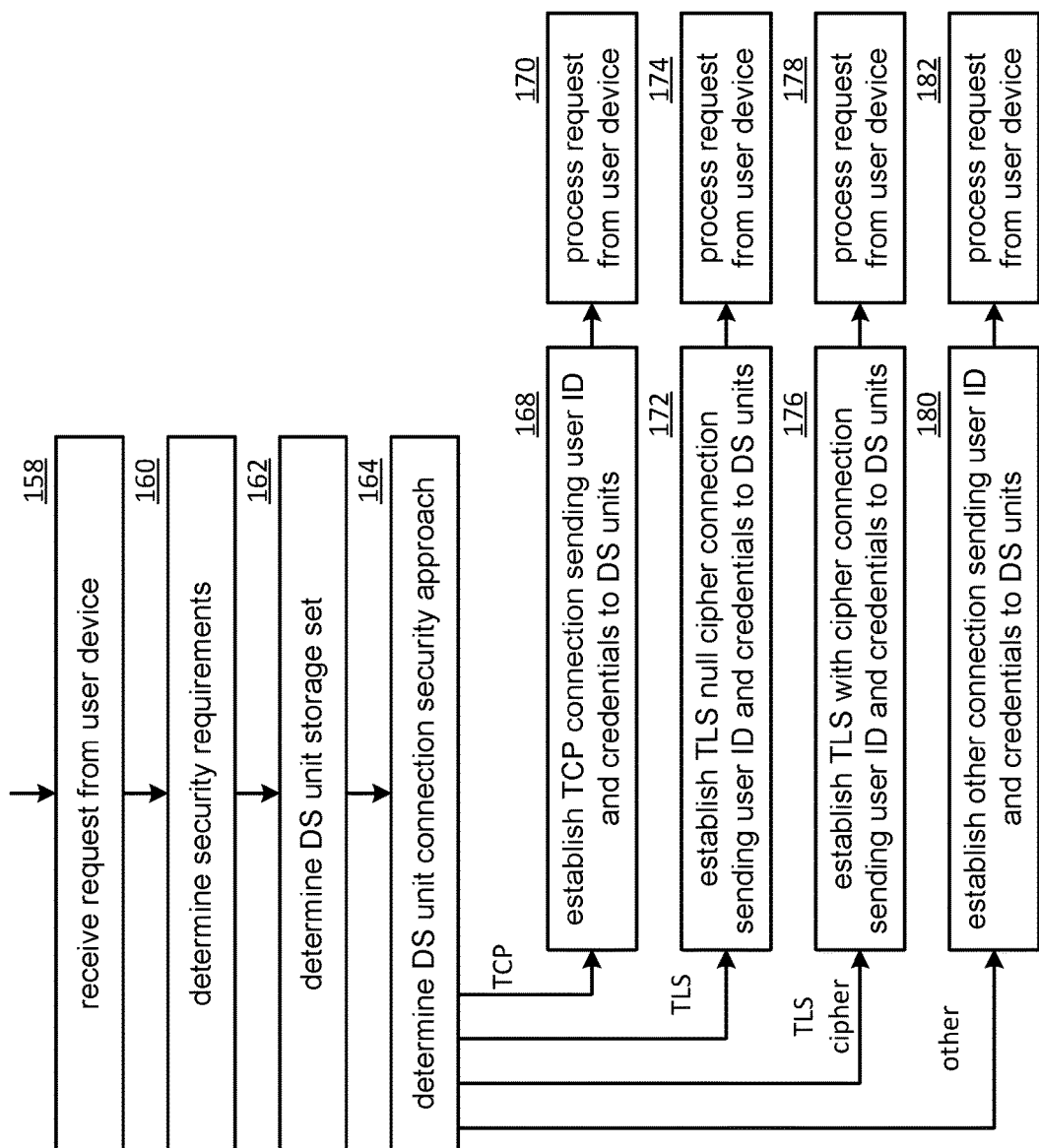
FIG. 11 is a flowchart illustrating an example of establishing a secure connection in accordance with the invention.

FIG. 11 is a flowchart illustrating an example of establishing a secure connection. The method begins at step 158 where a processing module (e.g., of a DS processing unit) receives a request (e.g., store, retrieve, delete, list) to access the DSN memory from a user device. The request may include one or more of a user ID, a request type, data type, user device authentication credentials (e.g., a PKI signed certificate), a security indicator, a performance indicator, and/or a priority indicator.

At step 160, the processing module determines security requirements for the connection, where the security requirements may specify a level of protection from tampering and/or eaves dropping. Such a determination may be based on one or more of a user vault lookup, the user ID, the request type, the data type, the user device authentication credentials (e.g., a PKI signed certificate), the security indicator, the performance indicator, and/or the priority indicator. For example, the processing module determines security requirements with no tampering or eaves dropping protection when the data type indicates a public text document and the security indictor indicates no security is required. In another example, the processing module determines security requirements with tampering protection and little eaves dropping protection when the data type indicates a private financial document and the security indictor indicates little security is required. In another example, the processing module determines security requirements with tampering protection and eaves dropping protection when the data type indicates a confidential document and the security indictor indicates higher security is required.

At step 162, the processing module determines a DS unit storage set, which includes DS units that make up pillars of where slices are stored for the same data segment. Such a determination may be based on one or more of a lookup of the virtual DSN address to physical location table, a user vault lookup, the security requirements, security capabilities of the DS unit (e.g., cipher algorithms), security attack history of the DS unit, a predetermination, a command, a list, the user ID, the request type, the security indicator, the performance indicator, and the priority indicator.

At step 164, the processing module determines DS unit connection security approach that includes a first level with no tampering protection and no eaves dropping protection, a second level with tampering protection and no eaves dropping protection, or a third level with tampering protection and eaves dropping protection. For example, the first level with no tampering protection and no eaves dropping protection may be implemented with transmission control protocol (TCP). The second level with tampering protection and no eaves dropping protection may be implemented with transport layer security (TLS) with a null cipher. The third level with tampering protection and eaves dropping protection may be implemented with transport layer security (TLS) with a cipher.

The processing module determination of the DS unit connection security approach may be based on one or more of the security requirements, a user vault lookup, security capabilities of the DS unit (e.g., cipher algorithms, location), security attack history of the DS unit, a predetermination, a command, a list, the user ID, the request type, the security indicator, the performance indicator, and/or the priority indicator. In an example, the processing module determines a different security approach for two or more DS units of the same DS unit storage set. For instance, a data segment may have a portion of its slices stored in one part of the DSN memory with one security approach and may have another portion of its slices stored in another part of the DSN memory with another security approach. As a more specific example, in a pillar width n=16 system, the processing module determines that the DS units of pillars 1-4 utilize the TCP approach (e.g., since they have superior security capabilities being located in the same rack as the DS processing unit), that the DS units of pillars 5-12 utilize the TLS null cipher approach (e.g., since they have good security capabilities being located in the same building complex as the DS processing unit), and that the DS units of pillars 13-16 utilize the TLS with a cipher approach (e.g., since they have the lowest security capabilities being located in different cities from the DS processing unit). In another example, the processing module determines that the same security approach shall be used for the DS units of the same DS unit storage set.

At step 168, the processing module establishes a TCP connection by sending the user ID and the authentication credentials to the DS unit when the security approach for the DS unit connection is to be TCP. In addition, the processing module adds the connection and its security approach to the connections list. At step 170, the processing module processes the request from the user device, which may include sending an access request response to the user device to confirm processing, accessing the DSN memory over the TCP connection with the DS unit to store, retrieve, and/or delete data, and to send and receive data to and from the user device.

At step 172, the processing module establishes a TLS null cipher connection by sending the user ID, the authentication credentials, and a key to utilize in the hash based message authentication code (HMAC) integrity verification to the DS unit when the DS processing determines the connection security approach for the DS unit connection to be TLS null cipher. In addition, the processing module adds the connection and its security approach to the connection list. At step 174, the processing module processes the request from the user device, which may include sending an access request response to the user device to confirm processing, accessing the DSN memory over the TLS null cipher connection with the DS unit to store, retrieve, and/or delete data, and to send and receive data to and from the user device. Note that the messages are verified for integrity by checking the HMAC of the payload utilizing the key.

At step 176, the processing module establishes a TLS with a cipher connection by sending the user ID, the authentication credentials, a key to utilize in the HMAC integrity verification, a cipher algorithm choice, and a cipher key to encrypt message payload to the DS unit when the DS processing determines the connection security approach for the DS unit connection to be TLS with a cipher. The processing module may determine the cipher algorithm choice based on the strongest cipher that the DS processing unit and DS unit both support (e.g., from a cipher list or cipher query). In addition, the processing module adds the connection and its security approach to the connection list. At step 178, the processing module processes the request from the user device, which may include sending an access request response to the user device to confirm processing, accessing the DSN memory over the TLS with a cipher connection with the DS unit to store, retrieve, and/or delete data, and to send and receive data to and from the user device. Note that the messages are verified for integrity by checking the HMAC of the payload utilizing the key. Further note that the payload is encrypted on one end of the connection and decrypted on the other end of the connection by utilizing the cipher algorithm and the cipher key.

At step 180, processing module establishes other connection types by sending the user ID and the authentication credentials to the DS unit when the DS processing determines the connection security approach for the DS unit connection to be other. At step 182, the processing module processes the request from the user device as previously discussed.

FIG. 12 is a flowchart illustrating an example of detecting a file change. The method begins at step 184 where a processing module of a user device calculates a hash of a data object being checked for a change since a previous backup. At step 186, the processing module retrieves the last hash saved for the data object based on accessing a list utilizing a data object name. The list links the hash of the data object and the data object name when it is sent to a DS processing unit for backup in the DSN memory.

The method continues at step 188 where the processing module determines if the calculated hash is the same as the last hash saved for the data object by comparing the two. Alternatively, the processing module determines if the file has changed by comparing the file to a saved last file (e.g., locally or in the DSN memory). When they are the same, the method continues at step 190 where the processing module tests another data object and the method repeats at step 184.

When the hashes are not the same, the method continues at step 192 where the processing module sends the data object, the data object name, and a backup command to a DS processing unit. In an example, the processing module sends the entire data object. In another example, the processing module sends a portion of the data object that has changed (e.g., determined by a more granular hash test) and a position of change indicator (e.g., which byte number range of a change insert). At step 194, the processing module saves the hash of the data object. Note that the method may repeat such that the processing module examines more data objects to detect changes.

Alternatively, or in addition to, the processing module may determine to delete an older data object revision (e.g., based on age, a schedule, a lack of use, a policy, a command, etc.) and may send a delete revision command with the revision number and data object name to the DS processing unit. The DS processing of the DS processing unit may delete EC data slices from the DSN memory for data segments that are unique and not in common with data segments of other revisions of the same data object.

FIG. 13 is a flowchart illustrating an example of backing up a data object. The method begins at step 196 where a processing module (e.g., of a DS processing unit) receives the data object, a data object name, and a backup command from a user device. At step 198, the processing module determines operational parameters based on one or more of a lookup of the virtual DSN address to physical location table, a command, a list, a vault lookup, and a predetermination. At step 200, the processing module creates a data segment of the data object in accordance with the operational parameters. Note that the process begins with the first data segment and may later loop back for subsequent data segments.

The method continues at step 202 where the processing module retrieves encoded data slices of the data segment and recreates a data segment from the retrieved slices in accordance with the operational parameters. At step 204, the DS processing determines if the recreated data segment and the data segment are substantially the same. When the data segments are not substantially the same, the method continues at step 206 where the processing module determines if the data segment number is the last data segment of the data object based on the data segment sizes and/or the size of the data object. When it is the last data segment, the method at step 210 is completed. When it is not the last data segment, the method continues at step 208 where the processing module targets the next data segment and the method repeats at step 200.

When the data segments are substantially the same, the method continues at step 212 where the processing module creates slices of the data segment in accordance with the operational parameters and sends the slices to the DSN memory with a store command for storage therein. In an example, the processing module determines to utilize the same operational parameters for the same data segment numbers of different revisions. In another example, the processing module determines to utilize different operational parameters for the same data segment numbers of different revisions. For instance, the data segment size may be different in the new revision. In another example, the processing module determines to utilize a less reliable distributed data approach for the new revision data segment since inherent backups of the older revision data segment are already stored in the DSN memory.

In addition, the processing module updates the user vault with a new revision number and any operational parameter changes for all updated data segments (e.g., by data segment number) of the same received data object. Alternatively, the data object retrieval method may utilize the user vault information including which data segments have new data and how they were stored. For instance, a recreated data object may be determined from a collection of recreated data segments of the latest revision (e.g., which may include older revision numbers and newer revision numbers).

Figure 14:
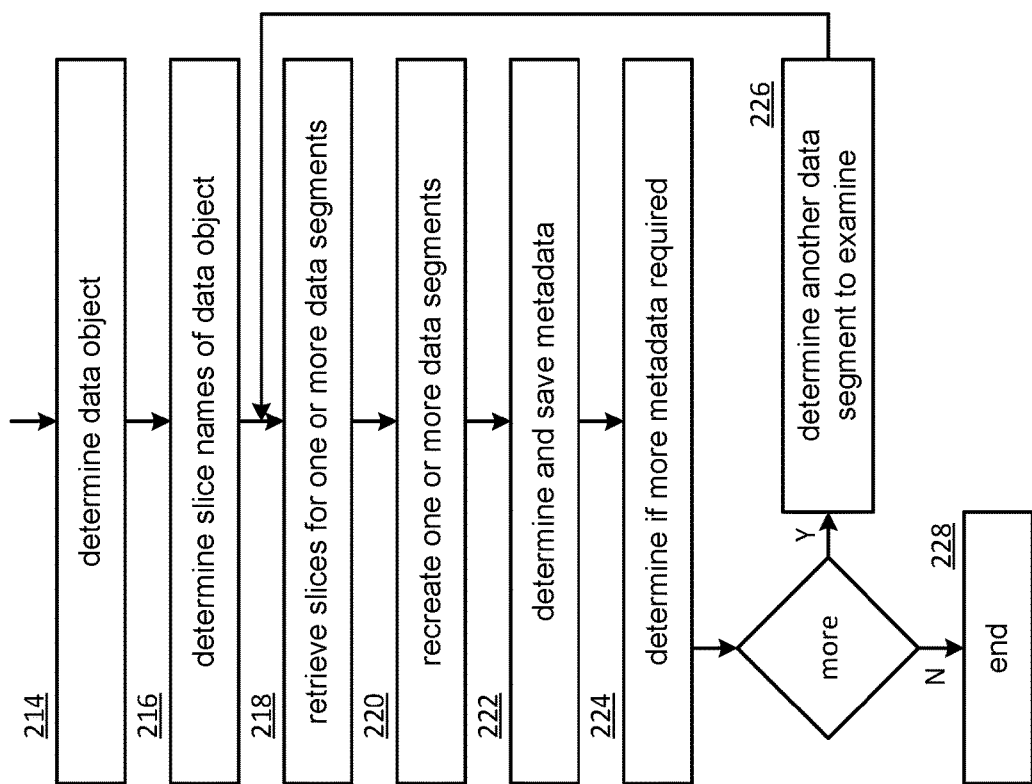
FIG. 14 is a flowchart illustrating an example of cataloging of dispersed storage network (DSN) memory content in accordance with the invention.

FIG. 14 is a flowchart illustrating an example of cataloging of dispersed storage network (DSN) memory content. The method begins with step 214 where a processing module (e.g., of one of the DS processing unit, the storage integrity processing unit, the DS unit, the user device, the DS managing unit, and/or a cataloging server) determines a data object name of a data object to catalog. Such a determination may be based on one or more of a last cataloged data object, a new data object received for storage in the DSN memory, a command, a list, a directory, a user vault lookup, and/or a predetermination. For example, the processing module determines to move to the next data object into a user directory. At step 216, the processing module determines slice names and operational parameters of the data object based on the data object name and the user vault as previously discussed.

The method continues at step 218 where the processing module retrieves slices from the DSN memory for one or more data segments where the data segments may be targeted to provide rich information. For example, the processing module targets the first data segments where information rich headers and descriptors may be located. In another example, the processing module targets the last data segments where information rich summaries and links may be located. At step 220, the processing module recreates the one or more data segments based on the retrieved slices in accordance with the operational parameters.

The method continues at step 222 where the processing module determines and saves metadata of the data segment in the user vault and/or a list linked to the data object name. Such a determination of the metadata may be based on searching and finding information related to one or more of type of data, key words, phrases, lyrics, patterns, people references, places, things, relationships to other objects, a priority indicator, a security indicator, a user ID, and a timestamp. In an example, the metadata determination is biased by the data type and filename (e.g., video file, text file, sound file). For example, the processing module searches for a name of a person when the data type indicates a text file. In another example, the processing module searches for a pattern of a face when the data type indicates a picture file.

At step 224, the processing module determines whether more metadata is required for this data object based on comparing the amount of metadata saved so far to a completeness threshold. In an example, the completeness threshold may require a minimum number of entries in a list of categories based on the data type or other clarifier. The processing module may determine that no more metadata is required when the amount of metadata saved so far is greater than the completeness threshold in each required category. The method ends with step 228 when the processing determines that no more metadata is required.

When more metadata is required, the method continues at step 226 where the processing module determines another data segment of the data object to examine. Such a determination may be based on one or more of how close the amount of metadata saved so far is to the completeness threshold, how many data segments are left, what portion of data segments have been examined, and the categories that have not reached their completeness thresholds. The method branches back to step 218.

Figure 15:
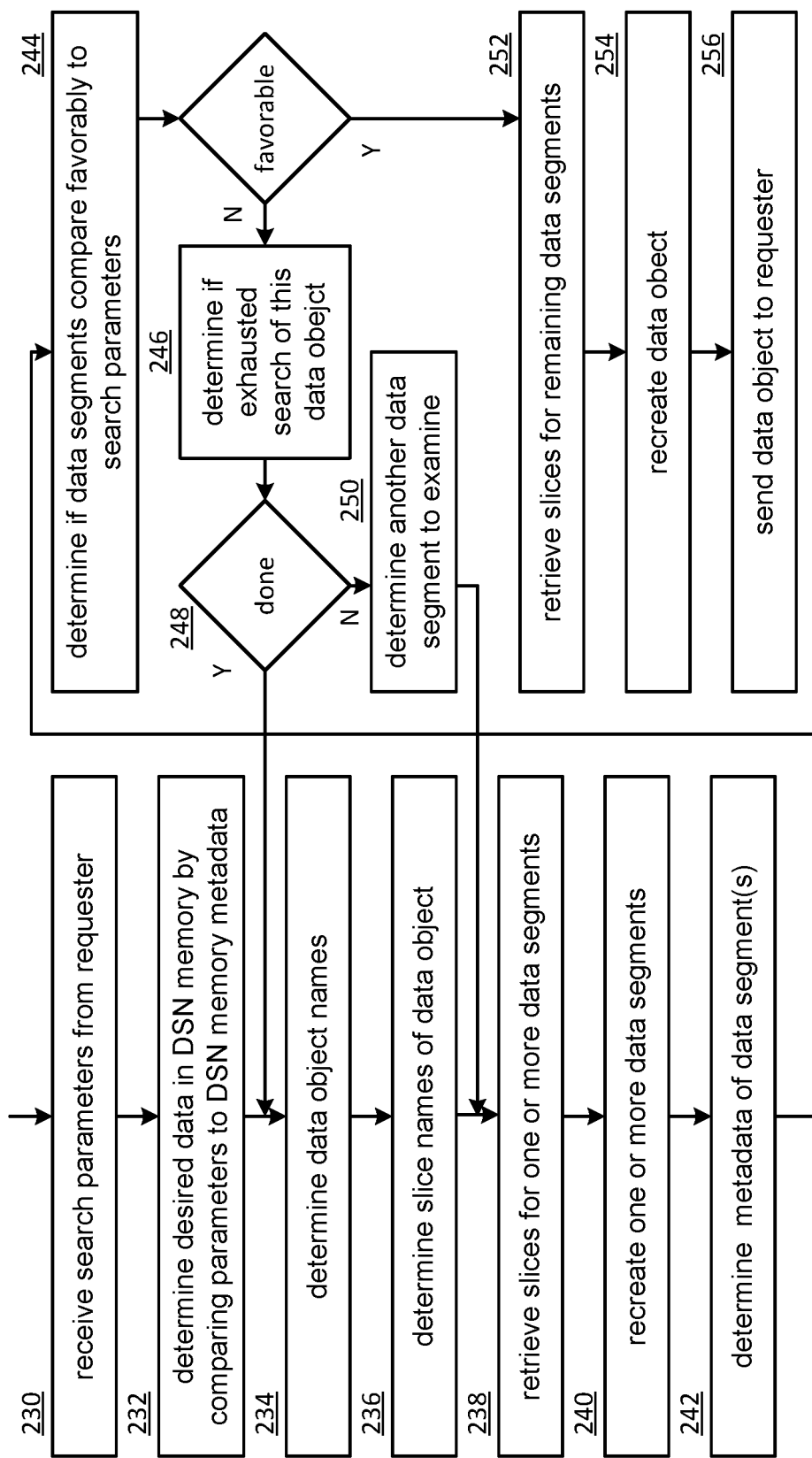
FIG. 15 is a flowchart illustrating an example of searching dispersed storage network (DSN) memory content in accordance with the invention.

FIG. 15 is a flowchart illustrating an example of searching dispersed storage network (DSN) memory. The method begins at step 230 where a processing module (e.g., of one of the DS processing unit, the storage integrity processing unit, the DS unit, the user device, the DS managing unit, and/or a cataloging server) receives search parameters from a requester (e.g., a user device). At step 232, the processing module determines desired data in DSN memory by comparing the search parameters for similarities to DSN memory metadata. In an example, the metadata was previously stored in a list or user vault. In another example, the metadata is obtained based on the search parameters. In yet another example, the metadata is obtained by a combination of previously stored metadata in a list or user vault and metadata based on the search parameters. The metadata is linked to one or more data objects stored as encoded and sliced data segments.

The method continues at step 234 where the processing module determines a data object name of the data object based on a linked list of metadata to data object names for metadata that is similar to the search parameters and which data objects may have been examined further so far (as discussed below). At step 236, the processing module determines slice names and operational parameters associated with the data object based on the data object name and the user vault as previously discussed. At step 238, the processing module retrieves slices from the DSN memory for one or more data segments based on a lookup of DSN locations in a virtual DSN address to physical location table. The retrieved slices may target data segments such as information headers at the beginning of the data object as discussed previously. At step 240, the processing module decodes the retrieved slices in accordance with the operational parameters to re-create one or more data segments.

The method continues at step 242 where the processing module determines metadata of the recreated data segment(s) as previously discussed. At step 244, the processing module determines whether the recreated data segment(s) compares favorably to the search parameters by comparing the two, which, for example, occurs when the two substantially include the same or similar information.

When the comparison is not favorable, the method branches to step 246 where the processing module determines whether the search has been exhausted of this data object based on completion of examining substantially all of the data segments. At step 248, when exhausted, the method repeats at step 234. When not exhausted, the method continues at step 250 where the processing module determines another data segment to examine for this data object. The processing module may selection another data segment based on which data segments have been examined so far and which categories are rich with information (e.g., places, patterns, names, key words, etc.). The method then repeats at step 238.

When the comparison of step 244 is favorable, the method continues at step 252 where the processing module retrieves slices for the remaining un-retrieved data segments. At step 254, the processing module recreates the data object based on the previously recreated data segments and the retrieved slices for the remaining un-retrieved data segments. At step 256, the processing module sends the data object that matched the search parameters to the requester.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for execution by one or more processing modules of one or more computing devices of a dispersed storage network (DSN), the method comprises:

receiving an access request corresponding to a data segment of a data object stored in the DSN, wherein the data segment is dispersed storage error encoded into a set of encoded data slices, wherein a decode threshold number of encoded data slices of the set of encoded data slices is required to decode the data segment, wherein the decoded threshold number is greater than one, and wherein the set of encoded data slices is stored or is to be stored in a plurality of dispersed storage units of the DSN;

determining connection security requirements corresponding to the access request;

determining a subset of the plurality of dispersed storage units based on the connection security requirements, wherein the subset includes at least the decode threshold number of dispersed storage units of the plurality of dispersed storage units;

determining, based on the connection security requirements, a connection security level for communicating with the subset of the plurality of dispersed storage units regarding the access request, wherein determining the connection security level includes determining a corresponding one of a plurality of connection security levels for each of the subset of the plurality of dispersed storage units based on a corresponding proximity of each of the subset of the plurality of dispersed storage units from the one or more computing devices; and communicating respective portions of the access request to each of the subset of the plurality of dispersed storage units in accordance with the corresponding one of the plurality of connection security levels.

2. The method of claim 1 wherein one of the plurality of connection security levels includes a first key employed for one of the subset of the plurality of dispersed storage units.

3. The method of claim 2 wherein another one of the plurality of connection security levels includes a second key employed for another one of the subset of the plurality of dispersed storage units.

4. The method of claim 1 wherein the plurality of connection security levels includes a first cipher employed for one of the subset of the plurality of dispersed storage units and a second cipher employed for another of the subset of the plurality of dispersed storage units.

5. The method of claim 1 wherein the plurality of connection security levels includes at least one of:
   a transmission control protocol connection that is based on a user identifier and security credentials;
   a transport layer security null cipher connection that is based on the user identifier and the security credentials; or
   a transport layer security cipher connection that is based on the user identifier and the security credentials.

6. The method of claim 1 wherein the plurality of connection security levels includes one of:
   a first level with no tampering protection and with no eavesdropping protection;
   a second level with the tampering protection and with the no eavesdropping protection; and
   a third level with the tampering protection and with the eavesdropping protection.

7. The method of claim 1 wherein the plurality of connection security levels is determined for the subset of the plurality of dispersed storage units further based on security capabilities of the subset of the plurality of dispersed storage units.

8. A dispersed storage (DS) processing unit for use in a dispersed storage network (DSN) comprises:
   an interface;
   memory; and
   a processing module operably coupled to the interface and the memory, wherein the processing module is operable to perform operations including:
      receiving, via the interface, an access request corresponding to a data segment of a data object stored in the DSN, wherein the data segment is dispersed storage error encoded into a set of encoded data slices, wherein a decode threshold number of encoded data slices of the set of encoded data slices is required to decode the data segment, wherein the decoded threshold number is greater than one, and wherein the set of encoded data slices is stored or is to be stored in a plurality of dispersed storage units of the DSN;
      determining connection security requirements corresponding to the access request;
      determining a subset of the plurality of dispersed storage units based on the connection security requirements, wherein the subset includes at least the decode threshold number of dispersed storage units of the plurality of dispersed storage units;
      determining, based on the connection security requirements, a connection security level for communicating with the subset of the plurality of dispersed storage units regarding the access request, wherein determining the connection security level includes determining a corresponding one of a plurality of connection security levels for each of the subset of the plurality of dispersed storage units based on a corresponding proximity of each of the subset of the plurality of dispersed storage units from the one or more computing devices; and
      communicating, via the interface, respective portions of the access request to each of the subset of the plurality of dispersed storage units in accordance with the corresponding one of the plurality of connection security levels.

9. The DS processing unit of claim 8 wherein one of the plurality of connection security levels includes a first key employed for one of the subset of the plurality of dispersed storage units.

10. The DS processing unit of claim 9 wherein another one of the plurality of connection security levels includes a second key employed for another one of the subset of the plurality of dispersed storage units.

11. The DS processing unit of claim 8 wherein the plurality of connection security levels includes a first cipher employed for one of the subset of the plurality of dispersed storage units and a second cipher employed for another of the subset of the plurality of dispersed storage units.

12. The DS processing unit of claim 8 wherein the plurality of connection security levels includes at least one of:
   a transmission control protocol connection that is based on a user identifier and security credentials;
   a transport layer security null cipher connection that is based on the user identifier and the security credentials; or
   a transport layer security cipher connection that is based on the user identifier and the security credentials.

13. The DS processing unit of claim 8 wherein the plurality of connection security levels includes one of:
   a first level with no tampering protection and with no eavesdropping protection;
   a second level with the tampering protection and with the no eavesdropping protection; and
   a third level with the tampering protection and with the eavesdropping protection.

14. The DS processing unit of claim 8 wherein the plurality of connection security levels is determined for the subset of the plurality of dispersed storage units further based on security capabilities of the subset of the plurality of dispersed storage units.

15. A non-transitory computer readable storage medium comprises:
   at least one memory section that stores operational instructions that, when executed by one or more processing modules of one or more computing devices of a dispersed storage network (DSN), causes the one or more computing devices to perform operations including:
- receiving an access request corresponding to a data segment of a data object stored in the DSN, wherein the data segment is dispersed storage error encoded into a set of encoded data slices, wherein a decode threshold number of encoded data slices of the set of encoded data slices is required to decode the data segment, wherein the decoded threshold number is greater than one, and wherein the set of encoded data slices is stored or is to be stored in a plurality of dispersed storage units of the DSN;
- determining connection security requirements corresponding to the access request;
- determining a subset of the plurality of dispersed storage units based on the connection security requirements, wherein the subset includes at least the decode threshold number of dispersed storage units of the plurality of dispersed storage units;
- determining, based on the connection security requirements, a connection security level for communicating with the subset of the plurality of dispersed storage units regarding the access request, wherein determining the connection security level includes determining a corresponding one of a plurality of connection security levels for each of the subset of the plurality of dispersed storage units based on a corresponding proximity of each of the subset of the plurality of dispersed storage units from the one or more computing devices; and
- communicating respective portions of the access request to each of the subset of the plurality of dispersed storage units in accordance with the corresponding one of the plurality of connection security levels.

16. The non-transitory computer readable storage medium of claim 15 wherein one of the plurality of connection security levels includes a first key employed for one of the subset of the plurality of dispersed storage units.

17. The non-transitory computer readable storage medium of claim 16 wherein another one of the plurality of connection security levels includes a second key employed for another one of the subset of the plurality of dispersed storage units.

18. The non-transitory computer readable storage medium of claim 15 wherein the plurality of connection security levels includes a first cipher employed for one of the subset of the plurality of dispersed storage units and a second cipher employed for another of the subset of the plurality of dispersed storage units.

19. The non-transitory computer readable storage medium of claim 15 wherein the plurality of connection security levels includes at least one of:
- a transmission control protocol connection that is based on a user identifier and security credentials;
- a transport layer security null cipher connection that is based on the user identifier and the security credentials; or
- a transport layer security cipher connection that is based on the user identifier and the security credentials.

20. The non-transitory computer readable storage medium of claim 15 wherein the plurality of connection security levels includes one of:
- a first level with no tampering protection and with no eavesdropping protection;
- a second level with the tampering protection and with the no eavesdropping protection; and
- a third level with the tampering protection and with the eavesdropping protection.

* * * * *